United States Patent [19]

Matsukawa et al.

[11] 4,062,799
[45] Dec. 13, 1977

[54] METHOD OF FORMING MICROCAPSULE FILMS HAVING LOW POROSITY

[75] Inventors: Hiroharu Matsukawa; Keiso Saeki, both of Fujinomiya, Japan

[73] Assignee: Fuji Photo Film Co., Ltd., Minami-ashigara, Japan

[21] Appl. No.: 677,953

[22] Filed: Apr. 19, 1976

Related U.S. Application Data

[63] Continuation-in-part of Ser. No. 437,589, Jan. 29, 1974, abandoned.

[30] Foreign Application Priority Data

Jan. 30, 1973 Japan .................................. 48-12299

[51] Int. Cl.$^2$ ............................................. B01J 13/02
[52] U.S. Cl. .................................. 252/316; 252/299; 252/408; 252/522; 282/27.5; 424/33; 424/34; 424/35; 424/37; 427/151; 427/152; 427/333; 427/338; 428/307

[58] Field of Search ................. 252/316; 427/333, 338

[56] References Cited

U.S. PATENT DOCUMENTS

| 2,886,445 | 5/1959 | Rosenthal et al. ................. 426/89 X |
| 2,996,517 | 8/1961 | Leech et al. ...................... 260/340.7 |
| 3,577,515 | 5/1971 | Vandegaer ....................... 252/316 X |
| 3,687,865 | 8/1972 | Katayama et al. .................... 252/316 |

Primary Examiner—Richard D. Lovering
Attorney, Agent, or Firm—Sughrue, Rothwell, Mion, Zinn, and Macpeak

[57] ABSTRACT

A method of forming low porosity microcapsule films which comprises chemically or ionically binding a water soluble or water dispersible heterocyclic amine to a microcapsule film forming material, or depositing the heterocyclic amine alone or a water insoluble material formed by reaction with the amine onto the microcapsule film.

17 Claims, No Drawings

METHOD OF FORMING MICROCAPSULE FILMS HAVING LOW POROSITY

REFERENCE TO COPENDING APPLICATION

This is a continuation-in-part application of Ser. No. 437,589, filed Jan. 29, 1974, now abandoned.

BACKGROUND OF THE INVENTION

1. Field of the Invention

This invention relates to a method of forming microcapsule films in a polar liquid. In greater detail the present invention relates to a method of forming (modifying) microcapsule films using polyfunctional amines (including derivatives thereof). The microcapsule films obtained by the method of the present invention have low porosity, are not water permeable, have low light transmission, are difficulty swelled by water or moisture, and are thick and strong.

2. Description of the Prior Art

Hitherto, many methods for encapsulating hydrophilic materials in a polar liquid are known.

The microcapsules function to change the apparent state and property of the materials, to protect the materials in a very fine state, to control the discharging ability and to discharge the contents thereof at an appropriate time.

The functions of the microcapsules are as follows:

a. it is possible to change a liquid material into an apparently solid material, b. it is possible to modify the weight and quantity of materials, c. it is possible to control the discharging of the materials contained in the capsules, d. it is possible to isolate reactive materials and thus two or more reactive materials can be contained at the same time in the same system for a long period of time or materials included can be protected from external influences or stored for a desired period of time, e. it is possible to shield the color, the flavor and the virulence of the materials contained, and f. they have the properties of a finely divided powder.

Much research has been conducted to apply these functions to recording materials, medical supplies, perfumes, agricultural chemicals, chemicals, adhesives, liquid crystal paints, foods, detergents, dyestuffs, solvents, catalysts, enzymes and rust inhibitors, etc. Pressure sensitive copying sheets, aspirin capsules, perfume containing capsules, menthol containing capsules, pressure sensitive capsule adhesives, rust inhibitor containing capsules used for riveting, liquid crystal containing capsules and insecticide containing capsules have been practically used.

The methods of encapsulating can be classified into chemical processes, physico-chemical processes and physico-mechanical processes. Further, combinations of these processes can be utilized.

Methods of producing microcapsules are illustrated in the following in greater detail.

As the methods for microencapsulating utilizing chemical processes, an interfacial polymerization process and an "in situ" polymerization process are known.

Microencapsulation using the interfacial polymerization process utilizes a reaction for synthesizing polymers. The interfacial polymerization process is reported in *Journal of Polymer Science*, 60, 299 (1950).

In this process, an interfacial polymerization reaction is utilized using a combination of a hydrophobic monomer (or a prepolymer thereof) and a hydrophilic monomer (or a prepolymer thereof). Namely, the hydrophobic monomer is added to an organic medium which has no affinity to water, and the solution is finely dispersed in an aqueous phase. Then a water soluble or water dispersible monomer is added to the aqueous phase, by which the polymerization reaction occurs at the water and oil interfaces to form polymer films. Compounds used for such film formation are polyfunctional materials which cause a polycondensation reaction or an addition polymerization reaction. Thus, the formed capsules have a polyamide, polyester, polyurethane or polyurea film.

A number of patents concern encapsulation utilizing this principle, as disclosed, for example in Japanese Pat. Publication Nos. 19574/63, 446/67, 771/67, 2882/67, 2883/67, 8693/67, 8923/67, 9654/67 and 11344/67, and British Pat. Specification Nos. 950,443, 1,046,409 and 1,091,141. In these methods, the rate of supplying the monomers becomes low in forming the capsule film and the supplying thereof finally stops. Consequently, the resulting microcapsules generally have a thin capsule film which is a typical semipermeable membrane. In the "in situ" polymerization process, film forming materials are supplied to either the inside or the outside of the drops of the core material, and consequently polymerization occurs at the surface of the drops of the core material. Since most known polymerization reactions can be utilized, many kinds of capsule films can be formed.

A number of patents concern methods in which an oily monomer and core materials coexist, for example as described in Japanese Pat. Publication No. 9168/61, British Pat. Specification No. 1,237,498, French Pat. No. 2,060,818, and 2,090,862. Methods for producing a polymer film on the surface of core material by applying a film forming material from the dispersion medium are described in British Pat. Specification No. 989,264, Japanese Pat. Publication No. 14327/62 and 12380/62.

In the capsule films produced by these methods, film formation is not sufficiently carried out in general, and, consequently, the porosity of the capsule films is comparatively high.

Methods for microencapsulating utilizing a physical process, include a phase separation method using an aqueous solution and a drying method comprising drying in a liquid.

The phase separation methods using an aqueous solution comprise separating a thick polymer phase from an aqueous solution of a water soluble polymer. These methods have been practically utilized for many purposes at present. Such methods include a complex coacervation process and a simple coacervation process.

The method utilizing complex coacervation are described in U.S. Pat. Nos. 2,800,457, 3,116,206, 3,687,865, 3,265,630 (Japanese Pat. Publication No. 7726/62), 3,190,837 (Japanese Pat. Publication No. 7724/62), and 3,041,289. As methods for hardening capsule films formed, methods are described in Japanese Pat. Publication No. 3878/62, 3876/62, 3877/62, 12376/62, 24782/62, and U.S. Pat. No. 3,401,123, wherein formaldehyde, glutaraldehyde and glyoxal are used as a hardening agent.

The capsule films formed by these methods have substantially poor resistance to water or moisture and undergo swelling or permit permeation of the contents, because they are produced from water soluble polymer starting materials. Further, low molecular weight materials can pass through capsule films formed because the films per se are porous. Furthermore, the contents (the encapsulated materials) can be extracted by alcohols, ethers or ketone solvents. Methods utilizing simple coacervation are described in U.S. Pat. No. 2,800,458, French Pat. No. 1,304,891, Japanese Pat. Publication No. 7727/62, 7731/62 and 9681/62.

The capsule films formed by these methods have the same properties as the capsule films produced by complex coacervation.

The drying method comprising carrying out drying in a liquid comprises dispersing a solution of a capsule film forming material containing core materials in a encapsulating medium and volatilizing the solvent to form rigid capsule films.

This method has been described in Japanese Pat. Publication Nos. 13703/67, 28744/64 and 28745/64.

The capsule films formed by this method are usually a thin semipermeable membrane. Accordingly, they have the disadvantage that low molecular weight core materials penetrate through the capsule film.

Typical methods for producing capsules and the characteristics of the capsule films formed have been described above. But, additionally, phase separation methods using an organic solvent (e.g., the methods described in Japanese Pat. Publication No. 12379/62 and U.S. Pat. No. 3,173,878) and drying methods comprising drying in a liquid (e.g., the methods described in Japanese Pat. Specification No. 28744/64 and 28755/64) are known, but they are not satisfactory because of the thickness and density of the capsule films.

An object of the present invention is to eliminate the technical problems of the above described numerous encapsulation methods and to provide a method of forming capsule films having improved "protective ability for the encapsulated materials" which is an ideal characteristic for "microcapsules".

Herein, the term "improvement of protective ability" means that the density of the formed capsule film is increased, that the permeability to water and resistance to light is reduced, that the degree of swelling by water or moisture is decreased and that the strength is increased.

SUMMARY OF THE INVENTION

The objects of the present invention can be attained using a method for forming microcapsule films having low porosity which comprises chemically or ionically binding a water soluble or water dispersable heterocyclic amine to a microcapsule film forming material, or depositing the heterocyclic amine solely or a water insoluble material formed by reaction with the heterocyclic amine onto the microcapsule films.

DETAILED DESCRIPTION OF THE INVENTION

The term heterocyclic amine as used in the present invention also includes derivatives thereof. Preferred examples of suitable heterocyclic amines are symmetric or asymmetric spiroacetal heterocyclic diamines.

Examples of the preferred spiroacetal heterocyclic diamines are represented by the following formula:

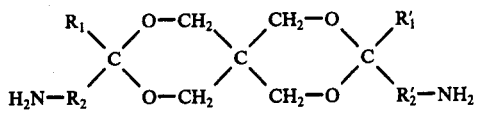

wherein $R_1$ and $R_1'$ each represents a hydrogen atom or a lower alkyl group (for example, a methyl group, an ethyl group and a propyl group) and $R_2$ and $R_2'$ each represents a linear or branched chain alkylene group having 1 to 7 carbon atoms. Examples of suitable alkylene groups are methylene, ethylene, propylene, iso-propylene, butylene, pentylene, hexylene and heptylene groups. Preferred alkylene groups are straight chain groups.

Preferred examples of derivatives of the above compound include (1) the condensation products produced by reacting the amino groups of a diamine represented by the above formula with a compound containing at least one oxirane group, (2) the addition products produced by reacting the above amine with acrylonitrile, (3) the reaction products produced by reacting the above amine with urea, thiourea or guanidine, and (4) the reaction products produced by reacting the above amine with an alkylene oxide such as ethylene oxide, propylene oxide, octylene oxide, etc.

Specific examples of spiroacetal diamines represented by the above formula include 3,9-bis-(2'-aminomethyl)-2,4,8,10-tetraoxaspiro-(5,5)-undecane; 3,9-bis-(2'-aminoethyl)-2,4,8,10-tetraoxaspiro-(5,5) -undecane; 3,9-diethyl-3,9-bis-(2'-aminoethyl)-2,4,8,10-tetraoxaspiro-(5,5)-undecane; 3,9-bis-(3'-aminopropyl)-2,4,8,10-tetraoxaspiro-(5,5)-undecane; 3,9-bis-(2'-aminopropyl)-2,4,8,10-tetraoxaspiro-(5,5)-undecane; 3,9-bis-(4'-aminobutyl)-2,4,8,10-tetraoxasprio-(5,5)-undecane; 3,9-bis-(5'-aminopentyl)-2,4,8,10-tetraoxaspiro-(5,5)-undecane; 3,9-bis(1',1'-dimethyl-4'-aminobutyl)-2,4,8,10-tetraoxaspiro-(5,5)-undecane; 3,9-bis-(5'-aminopentyl)-2,4,8,10-tetraoxaspiro-(5,5)-undecane; 3,9-bis-(6'-aminohexyl)-2,4,8,10-tetraoxaspiro-(5,5)-undecane and 3,9-(7'-aminoheptyl)-2,4,8,10-tetraoxaspiro-(5,5)-undecane.

These compounds can be easily prepared according to processes described in, for example, German Pat. No. 1,092,029 and U.S. Pat. No. 2,996,517.

The compounds having an oxirane group which are a constituent of the derivatives include alkyl glycidyl ethers such as propyl glycidyl ether, butyl glycidyl ether and allyl glycidyl ether; condensates of epichlorohydrin and bisphenol (e.g. Epikote 562, Epikote 812, Epikote 815, Epikote 820, Epikote 828 and Epikote 834 trade names, produced by the Shell International Chemical Co.); phenol type epoxides prepared by reacting epichlorohydrin with a precondensate of a phenol resin; polyglycol type epoxides prepared by reacting a polyglycol such as ethylene glycol, propylene glycol and glycerol with epichlorohydrin; glycidyl esters in which the hydrogen of the carboxyl group is substituted with a glycidyl group (for example, "Kardula E" trade name, produced by the Shell International Chemical Co.); ethylene oxide, propylene oxide, octylene oxide and epoxypolybutadiene; epoxidized vegetable oil fatty acids prepared by reacting a glyceride of an unsaturated fatty acid with peracetic acid; and epoxy glycerides.

The condensation products of a compound having oxirane groups and the above described spiroacetal type diamine can be prepared according to well known methods by mixing and heating these materials in the presence or absence of a solvent to a temperature above the melting point of the spiroacetal diamine. Preferred condensates can be prepared by reaction in a system containing a spiroacetal diamine having one or more amino groups per oxiran group. The detail of this process are described in Example 1 of Japanese Pat. Publication No. 26097/68.

The addition products of the heterocyclic amine and acrylonitrile of the present invention can be easily produced according to known methods by heating these materials at a temperature above the melting point of the spiroacetal diamine component or near the boiling point of acrylonitrile in the presence or absence of a solvent. The details are described in Example 1 of Japanese Pat. Publication No. 2586/69. Further, the reaction products of heterocyclic amines and urea, thiourea or guanidine can also be easily produced using known methods.

The method of forming microcapsule films of the present invention can be applied to any microencapsulation process.

The heterocyclic amines used in the present invention are added to the system during a step for producing capsules or after formation of capsule films. However, in these processes it is preferred to add the heterocyclic amines as follows.

1. Interfacial Polymerization Process

It is preferred to add the heterocyclic amines during or after a dispersion step in the process comprising emulsification→dispersion→hardening→conclusion of encapsulation.

2. Coacervation Process

It is preferred to add during or after the cooling step which comprises cooling at a temperature below the gelling point of an ionizable hydrophilic colloid (particularly, gelatin) in the process comprising emulsification→coacervation→cooling→pre-hardening treatment→hardening→conclusion of encapsulation, and particularly at the pre-hardening treatment step. The pre-hardening treatment step means the step prior to that step in which the hardening agent is added and an alkali are copresent in the same system.

In the complex coacervation process to which this invention is applicable, the first step is an emulsification step in which a water-immiscible oil is emulsified in an aqueous solution of at least one hydrophilic colloid ionizable in water (the first sol) and then admixing an aqueous solution of a hydrophilic colloid (the second sol) having an electric charge opposite to that of the first sol. The temperature of emulsification and droplet formation is not important but must be no less than gelation point of gelatin, preferably about 40° C. The size of the droplets formed in this step is not critical and the % by weight of the hydrophilic colloid can be freely selected because the hydrophilic colloid solution is subsequently diluted with water added in the coacervation step to be discussed hereinafter. The time of admixing the first sol and the second sol can also be freely varied. As another embodiment, a water-immiscible oil can be emulsified in an aqueous solution of hydrophilic colloids which are ionizable in water and at least one of which is positively charged. The ratio of the hydrophilic colloids employed can be varied, but it is preferred that the ratio by weight of one hydrophilic colloid (on a solids basis) to the second hydrophilic colloid of opposite charge thereto be about 1.

In the next step, water is either added to the emulsified mixture or the pH is adjusted to cause coacervation. The amount of water to be added is that which will cause coacervation and the amount to be added can be easily selected by one of ordinary skill in the art, for example, based on the disclosure contained in U.S. Pat. No. 2,800,457. Again, the temperature of the system is not limiting but should not be lower than the gelation point of the gelatin. It is, however, preferred that the temperature of the system remain substantially constant until coacervation has been achieved. Where pH adjustment is used, the initial pH of the system and the pH change are not limiting but the final pH of the system must be no greater than the isoelectric point of gelatin, preferably from a pH of 7 to 2, for example, about 4. Suitable pH adjusting agents can be organic acids (e.g., succinic acid, acetic acid, etc.) and mineral acids (e.g., hydrochloric acid, etc.).

In step 3, the coacervates are cooled to cause gellation. The temperature at the beginning of the cooling step is substantially the same as that used in the coacervation step. The temperature at the completion of the cooling step should be no greater than gelation point of the gelatin and generally is no lower than the freezing point of water (e.g., until about 5° C), usually at about 10° C.

The rate of cooling is not important and will depend on the volume to be cooled. Rapid cooling can be utilized in accomplishing the gellation step.

Once the coacervates have gelled, the pH of the system is adjusted to the alkaline side. A preferred pH after adjustment is from a pH of about 7.5 to about 12. Usually the final pH will be about 10. The temperature during pH adjustment to the alkaline side is not critical but thus temperature should be no greater than the gelation point of the gelatin. The pH can be rendered alkaline utilizing agents such as NaOH, KOH and the like. A hardening agent can be added after adjusting the pH to the alkali side. Both a hardening agent and an alkali can be also added at the same time.

The above steps can be followed where desired by a hardening step in which the temperature of the coacervate is optionally raised to more effectively harden the coacervate. The temperature is, for example, about 40° C to 60° C.

As the hydrophilic colloids, there are included natural or synthetic ones such as amino acid containing compounds, for example, gelatin, casein, alginate, and the like, saccharides, such as gum arabic, carrageenan, copolymers such as styrenemaleic anhydride copolymers, methyl vinyl ether-maleic anhydride copolymers, and the like, cellulose compounds, such as carboxymethyl cellulose, cellulose sulfate and the like, soluble starches such as sulfated starch, etc.

As the hydrophobic materials for the nucleus of the individual microcapsules, there are illustrated natural mineral oils, animal oils, vegetable oils, synthetic oils, and the like. Examples of the mineral oils include petroleum and petroleum fractions such as kerosene, gasoline, naphtha, and paraffin oil. Examples of the animal oils include fish oils, lard oil and the like. Examples of the vegetable oils include peanut oil, linseed oil, soybean oil, castor oil, corn oil and the like. Examples of synthetic oils include biphenyl derivatives such as alkylated biphenyls (e.g., methyl, ethyl, or isopropyl-substituted biphenyls), phosphate esters, naphthalene derivatives, phthalic acid derivatives, salicyclic acid derivatives and the like.

In order to emulsify and disperse a hydrophobic liquid which is to be the nuclear material in water, an anionic, cationic or non-ionic surface active agent is preferably used to prevent phase reversal (i.e., formation of a w/o emulsion). Turkey red oil or sodium alkyl benzene sulfonates can be utilized. An oil-in-water emulsion can be obtained by emulsifying a hydrophobic oily liquid which is converted to the nuclear material in at least one hydrophilic colloid aqueous solution, the colloid becoming a wall material. The resulting emulsion is then subjected to water dilution and adjustment of pH to thereby deposit the coacervate around the emulsified individual oil droplets. The coacervate deposited on the surface of the oil droplets is cooled from outside the vessel to gell the wall film. Then, in order to harden the wall film, formaldehyde, a dialdehyde, e.g., glutaraldehyde, or glyoxal; a ketoaldehyde, e.g., methylglyoxal; or a combination of formaldehyde and a dialdehyde or a ketoaldehyde; or an oxidation product of a polysaccharide is added to the system followed by adjusting the pH of the system to the alkali side, or else, the pH of the system is adjusted to the alkali side followed by adding the hardening agent thereto. The stage of adding formaldehyde is not particularly limited and may be before, during or after the above-described hardening procedure. The same effects of the combined use of the formaldehyde with a dialdehyde or a ketoaldehyde are obtained in any case.

In order to provide the capsule wall film with heat resistance, the system is left for a long period of time for example, a day, at a low temperature for example, room temperature, or, if short time processing is required, heated to about 40° to 60° C.

An encapsulation process utilizing coacervation has the defect that the hardening pretreatment step takes a long time. It is beneficial to use the procedure of British pat. specification No. 1,253,113 in coacervation, which improves the above defect and in the present invention because it becomes possible to convert the pH to the alkaline side in a short time in a hardening pretreatment by adding "a shock-preventing agent" in the presence of the hardening aldehydes.

The term "shock" as used herein means the phenomenon in which, in carrying out the hardening pretreatment of a coacervation capsule solution containing gelatin as described in the aforesaid British Patent specification, the viscosity is rapidly increased when the pH of the system is around the isoelectric point of gelatin. The term "shock-preventing agent" means a solution which prevents such shock. Shock-preventing agents which can be used in this invention are polyelectrolytes having an anionic functional group. As examples of such polyelectrolytes there may be mentioned modified cellulose, an anionic starch derivative, an anionic acid polysaccharide, a condensate of naphthalene sulfonic acid and formaldehyde, a hydroxyethyl cellulose derivative, a copolymer of vinylbenzene sulfonate, a copolymer of sodium acrylate and a copolymer of maleic acid anhydride.

As examples of modified cellulose, there may be mentioned polysaccharides having $\beta$-1,4-glucoside bonds of glucose and having anionic functional groups. Part or all of the hydroxyl groups of the cellulose may be etherified or esterified. Illustrative of cellulose ethers are carboxymethyl cellulose, carboxyethyl cellulose and metal salts thereof, and illustrative of cellulose esters are cellulose sulfate, cellulose phosphate and metal salts thereof.

The anionic starch derivative may be one which is composed of a linear polysaccharide amylose formed by only $\alpha$-1,4 bonds of D-glucose, and a branched polysaccharide amylopectin formed by mainly $\alpha$-1,4 bonds of D-glucose and partially side chain branched by $\alpha$-1,6 bonds.

As examples of the above starch derivatives may be mentioned carboxymethyl starch, carboxyethyl starch, starch sulfate, starch phosphate and starch xanthate. These are obtained by etherification or esterification of corn starch, wheat starch, rice starch, potato starch, sweet potato starch or tapioca starch, which may be extracted from either the seeds or the roots of the plants in high yield.

As examples of the anionic acidic polysaccharides, there may be mentioned polygalacturonic acid, which is obtained by polycondensing linearly D-galacturonic acid between $\alpha$-1,4 bonds thereof. The acid polysaccharide contains pectin, pectic acid and pectinic acid. These are basic substances comprising pectin matter in a high plane and have been defined as follows: pectinic acid-olygalacturonic acid in the colloid form containing some methyl ester groups pectin-water soluble pectinic acid containing methyl ester groups pectic acid-ollygalacturonic acid in the colloid form containing no methyl ester groups.

The separation of these compounds may be conducted, in general, by extraction from acids.

The condensate of naphthalene sulfonic acid and formaldehyde is represented by the following formula:

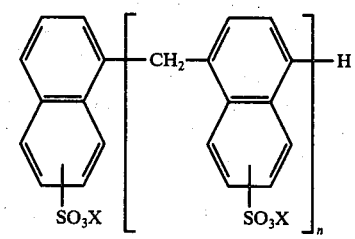

wherein X is a hydrogen atom, an alkali metal or an ammonium group, and $n$ is a positive integer.

Shock-preventing ability of the above condensate is influenced by the degree of polymerization, and it is preferable that $n$ be 5 to 9. In general, the larger the value of $n$, the more the water-solubility and viscosity increases. These compounds are described in *Kogyo Kagaku Zashi*, 66 [1], pp. 55–69 (1963).

As examples of the hydroxyethyl cellulose derivatives, there may be mentioned carboxymethyl ether of hydroxyethyl cellulose, hydroxyethyl cellulose sulfate and hydroxyethyl cellulose phosphate and the like.

As examples of the copolymers of vinylbenzene sulfonate, there may be mentioned vinylbenzene sulfonate-acryloylmorpholine copolymer, vinylbenzene sulfonate-morpholinomethylacrylamide copolymer, vinylbenzene sulfonate acrylamide copolymer, vinylbenzene sulfonate-vinylpyrrolidone copolymer, and vinylbenzene sulfonate-methoxymethylacrylamide.

These polymers contain the following group in the molecule:

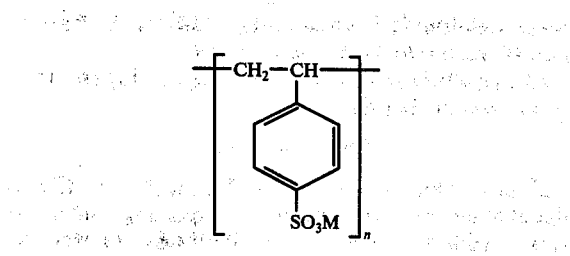

wherein M is an alkali metal and $n$ is a positive integer.

The amount of vinylbenzene sulfonate in the copolymer is preferably 45–95 mol percent, more preferably 60–85 mole percent, and it is preferred, for the purpose of this invention, to use a copolymer having a molecular weight of 10,000 to 3,000,000, particularly 100,000 to 1,000,000.

As examples of copolymers of acrylic acid, there may be mentioned acrylic acid-acryloylmorpholine copolymer, acrylic acid-morpholinomethylacrylamide, acrylic acid-acrylamide copolymer, acrylic acid-vinylpyrrolidone copolymer, and acrylic acid-methoxymethylacrylamide.

These polymers contain the following group:

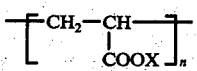

wherein X is a hydrogen atom or an alkali metal, and $n$ is a positive integer.

The amount of acrylic acid in the copolymer is preferably in 40 to 95 mol percent, especially 50 to 85 mol percent, and it is preferable, for the purpose of this invention, to use a copolymer having molecular weight of 6,000 to 2,000,000, especially 50,000 to 1,000,000.

As examples of copolymers of maleic acid anhydride, there may be mentioned a copolymer of maleic acid anhydride and an unsaturated compound having an active double bond (e.g. styrene, ethylene, methylvinyl ether, vinylacetate) salts thereof (e.g. alkali metal salts such as Na and K, ammonium salts) and half esters thereof (e.g. alkyl esters such as methyl esters and ethyl ester).

The amount of the polyelectrolyte is from 1/12 to ½ by weight based on the total amount of hydrophilic colloids present.

As has been stated above, the process of the present invention is extremely useful for the production of microcapsules. It is useful to combine the present invention and those processes as described in OLS (Offenlegungsschrift) Nos. 2,133,052 and 2,138,842 or U.S. Ser. No. 354,050/73, now U.S. Pat. No. 3,970,585. It is also useful to combine the present invention and those processes relating to the addition of a coacervate-inducing agent at a step prior to the completion of gelation of the coacervate, as described in, for example, OLS Nos. 2,120,922; OLS 2,135,68; OLS 2,210,367.

3. "In situ" Polymerization Process

It is preferred to add the heterocyclic amine during or after a dispersion step in the process comprising emulsification→dispersion→hardening→conclusion of encapsulation.

4. Other Capsulation Processes

It is preferred to add the heterocyclic amine during or after a dispersion step.

In the present invention, the heterocyclic amines can be used alone or they can be used together with water-soluble compounds which form water insoluble materials upon reaction with the heterocyclic amines, such as aldehydes, and epoxy compounds (they can be added separately or at the same time to the system).

The above described compounds are added in an amount of about 1/100 to about 10 times and particularly about 1/10 to about 2 times by weight of the heterocyclic amines used.

In the practice of the present invention, more dense capsule films can be formed if water soluble or water dispersable amines having at least one amino group in addition to the above described heterocyclic amines, such as octyl amine, nonyl amine, dodecyl amine, stearyl amine, ethylene diamine, trimethylene diamine, 1,7-diaminoheptane, 1,9-diaminononane, 1,10-diaminodecane, N,N'-diaminopropyl piperazine, diethylene triamine, triethylene tetramine, tetraethylene pentamine, m-hexamethylene triamine, tris-(N-aminopropyl) isocyanurate, guanidine and trimethylolmelamine, are used together with the above described heterocyclic amines in the amount below about 70% and particularly below 50% (by weight) thereof. The above described amines can be added separately or simultaneously with the addition of the heterocyclic amines.

Many of the spiroacetal diamines of the present invention have the properties that under alkaline conditions cloudiness results and they easily react with the above described compounds such as aldehydes resulting in precipitation in water. Further, they are stable themselves and do not color during storage. Accordingly, they are very easy to treat.

These properties remarkably increase the effects of the present invention.

Furthermore, it is preferred to change the pH of the system into a more alkaline range by adding an alkali such as sodium hydroxide, potassium hydroxide and sodium carbonate after adding the heterocyclic amines and/or other additives and to heat to a temperature above room temperature (about 18° C).

In any encapsulating process, the addition of the heterocyclic amines of the present invention should be carried out under agitation.

The aldehydes which are one of the preferred additives include acetaldehyde, formaldehyde, glyoxal, methylglyoxal, glutaraldehyde, acrolein, 2-hydroxyadipaldehyde and dialdehydostarch. By use of these aldehydes, the present invention can be more effectively carried out.

The aldehydes can be added before or after addition of the heterocyclic amines. Of course, they can be added simultaneously with addition of the heterocyclic amines.

In the practice of the present invention, the quantity of the heterocyclic amines is not limited. Because, the effect caused by the compound increases depending on the quantity thereof, and thus the quantity thereof is determined on the basis of the characteristics desired. It is preferred that the amount of the amines be within a range of from 1/1000 to ½, more preferably 1/100 to 1/5, weight ratio based on the core (nucleus) material. Especially, it is effective to modify the capsule films formed from gelatin. Namely, surprising effects, for example, an improvement in light transmittance, a prevention of swelling by moisture, an improvement in strength and an increase in density can be obtained.

In the prior method for producing capsules using aldehydes as a hardening agent, unreacted aldehydes generally remain and cause stimulative odor. According to the present invention, these residual isolated aldehydes effectively disappear and, consequently, capsules do not have a bad odor.

Moreover, it is a very important fact in the present invention that the capsules neither coalesce nor aggregate even though the capsule films are remarkably modified.

The synthesis of the heterocyclic amines of the present invention are illustrated in greater detail in the following synthesis examples. Unless otherwise indicated, all parts, percents, ratios and the like in all of the examples given hereinafter are by weight.

SYNTHESIS 1

6.8g (0.05 mols) of pentaerythritol, 1g of p-toluene sulfonic acid and 100ml of toluene were mixed with 18.5g (0.1 mols) of 5-cyanopentanal dimethylacetal. The mixture was refluxed by heating for 4 hours. The reaction mixture was filtered and the filtrate was condensed under vacuum to produce 17.9g of 3,9-bis-(4'-cyanobutyl)-2,4,8,10-tetraoxaspiro (5,5) undecane as a viscous liquid.

This viscous liquid was dissolved in 60 ml of ethanol and charged into an autoclave together with 100 ml of ethanol saturated with ammonia and 5 g of an activated (alkali-treated) Raney cobalt catalyst. Hydrogen was added at an initial hydrogen pressure of 107 kg/cm$^2$ at a reaction temperature of 120° C for 2 hours. After separating the catalyst by filtration, the filtrate was condensed and the condensate was distilled under vacuum to produce 8.2 g of 3,9-bis-(5'-aminopentyl)-2,4,8,10-tetraoxaspiro (5,5)undecane as a distillate having a boiling point range of 217°-221° C/0.2 mmHg.

33.1 Parts by weight of the resulting 3,9-bis-(5'-aminopentyl)-2,4,8,10-tetraoxaspiro-(5,5)-undecane were melted by heating. Then 13.0 parts by weight of butyl glycidyl ether were added dropwise with stirring while keeping the temperature at 60° C. After addition, the mixture was stirred for an additional 2 hours. The resulting reaction condensate was a colorless transparent viscous liquid.

SYNTHESIS 2

13.6 g of 3,9-bis-(6'-cyanohexyl)-2,4,8,10-tetraoxaspiro-(5,5)-undecane was produced by condensing 11.9 g of 7-cyanoheptanal dimethyl acetal with 43.5 g of pentaerythritol. Then this was catalytically reduced as described in Synthesis 1 to produce 8.6 g of 3,9-bis-(7'-aminoheptyl)-2,4,8,10-tetraoxaspiro-(5,5)-undecane. Melting point: 74°-75° C.

386 Parts by weight of the thus resulting 3,9-bis-(7'-aminoheptyl)-2,4,8,10-tetraoxaspiro-(5,5)-undecane were melted at 80°-85° C, and 130 parts by weight of butyl glycidyl ether were added dropwise thereto over a 1.5 hour period with stirring. After addition, the mixture was stirred for an additional 2 hours to produce colorless transparent viscous liquids.

SYNTHESIS 3

109.6 g (0.4 mols) of 3,9-bis-(3'-aminopropyl)-2,4,8,10-tetraoxaspiro-(5,5)-undecane (hereinafter, ATU) was melted in a reactor equipped with a sitrrer, a reflux condenser, an addition funnel and a thermometer while keeping the temperature at 45°-55° C. Then 30.0 g of phenyl glycidyl ether was added dropwise over a 2 hour period with stirring. After addition, the mixture was stirred for an additional 2 hours.

The resulted reaction mixture was a colorless transparent viscous liquid.

SYNTHESIS 4

27.4 g (0.1 mols) of ATU and 11.4 g (0.1 mols) of allyl glycidyl ether were subjected to reacting under the same conditions as described in Synthesis 3 to produce.

SYNTHESIS 5

27.4 g (0.1 mols) of ATU and 6.5 g (0.05 mols) of butylglycidyl ether were subjected to reacting under the same conditions as described in Synthesis 3 to produce.

SYNTHESIS 6

27.4 g (0.1 mols) of ATU and 9.3 g (0.05 mols) of E Kardula (trade name, glycidylester produced by the Shell International Chemical Co.) were subjected to reacting in the same manner as described in Synthesis 3.

SYNTHESIS 7

274 g (1 mol) of 3,9-bis-(3'-aminopropyl)-2,4,8,10-tetraoxaspiro-(5,5)-undecane was melted with keeping the temperature at 45°-55° C. Then, 53 g (1 mol) of acrylonitrile was added dropwise over a 1 hour period with stirring. After the addition, stirring was continued at 60° C for an additional 1 hour to stoichiometrically produce a colorless transparent viscous liquid.

The present invention will be illustrated in greater detail by several examples. The following examples demonstrate the characteristics of the present invention. However, these examples are not to be construed as limiting the scope of the present invention.

EXAMPLE 1

6 Parts of acid treated gelatin (from pigskin) having an isoelectric point of 8.2 and 6 parts of gum arabic were dissolved in 30 parts of water at 40° C. To this solution, 0.2 parts of sodium nonylbenzene sulfonate were added as an emulsifier.

30 Parts of diisopropylnaphthalene containing 2.5% (by weight) of Crystal Violet lactone (CVL) and 2.0% (by weight) of benzoyl leuco Methylene Blue as a color forming oil were added to the colloid solution with vigorous stirring to produce an oil/water (O/W) emulsion. Stirring was stopped when the oil drop size became 6 – 10μ.

To this emulsion, 200 parts of warm water at 40° C were added. 20% hydrochloric acid was added dropwise while stirring to adjust the pH to 4.4. The mixture was cooled externally with stirring to gel the colloid films deposited on the oil drops. When the liquid temperature became 10° C, 2.0 parts of a 37% formaldehyde solution were added while stirring. Then 20 parts of a 7% solution of sodium carboxymethyl cellulose having an etherification degree of 0.75 were added thereto.

A solution prepared by diluting 2.0 parts of the compound of Synthesis 1 with 5 parts of water was added dropwise thereto. Then a 10% solution of sodium hydroxide was added dropwise thereto to adjust the pH to 10. The mixture was kept at 40° C for 1 hour by external warming to obtain color former oil containing capsules.

The capsules obtained by this example were useful for producing a pressure-sensitive copying paper. For example, 10 parts of a 10% solution of PVA-210 (a polyvinyl alcohol, average degree of polymerization 1000, degree of saponification — 87%, produced by Kuraray Co.) and 3 parts of corn starch were added to 100 parts of the resulting capsule slurry. The mixture was applied in an dry amount of 5.5 g/m² to a sheet of paper having a weight of 50 g/m² and dried to produce a coated paper. On the other hand, a mixture prepared by adding 7 parts of a 10% solution of PVA-210 and 3 parts of corn starch to 100 parts of capsules which were produced without using the compound of Synthesis 1 was applied in a dry amount of 5.5 g/m² to a sheet of paper a weight of 50 g/m² and dried to produce a copying paper (Comparison 1). When the characteristics of these coating paper were compared, the results shown in Table 1 were obtained.

From the results set forth in Table 1, it can be seen that the strength, permeability of the capsule films and the moisture resistance were remarkably improved.

Table 1

| Properties of Capsule Films | Capsules of Example 1 D | Capsules of Comparison 1 D |
|---|---|---|
| Strength of Capsule Film | | |
| Pressure Resistance | 0.12 | 0.15 |
| Friction Resistance | 0.08 | 0.12 |
| Moisture Resistance | 0.30 | 0.40 |
| Permeability of Capsule Film | | |
| 1 | 0.25 | 0.85 |
| 2 | 0.06 | 0.28 |
| 3 | 0.08 | 0.24 |
| Light Stability (light permeability) | | |
| 1. Coloring after Exposure | | |
| Exposure 10 Minutes | 0.10 | 0.12 |
| 30 Minutes | 0.15 | 0.22 |
| 2. Activity of Color Former | | |
| Exposure 0 Minute | 0.95 | 0.94 |
| 10 Minutes | 0.92 | 0.90 |
| 30 Minutes | 0.87 | 0.81 |
| 60 Minutes | 0.82 | 0.68 |

Excepting for the item "Activity of Color Former", the smaller the color density D is, the more preferable the result is.

Method of Testing

Developer Sheet Used: Method of Producing Developer Sheet A:

100 Parts of activated acid clay which was treated with sulfuric acid were dispersed in 300 parts of water containing 6 parts of a 40% aqueous solution of sodium hydroxide and 0.5 parts of sodium hexametaphosphate using a Kedy mill. To this dispersion, 4 parts of Alon 20LL (trade name: a sodium polyacrylate produced by the Toa Gosei Chemical Industry Co.) were added. Then, 35 parts of Dowlatex 636 (trade name: styrenebutadiene latex produced by the Dow Chemical Co.) were added thereto.

This solution was applied to a sheet of paper having a weight of 50 g/m² by knife coating so as to provide a solids content of 8.0 g/m². Further, in order to increase the surface smoothness the coated paper was treated by a super-calender to produce a sheet having a surface smoothness of 120 seconds (measured using a Beck smoothness tester).

Method of Producing Developer Sheet B:

5 Parts of acid clay and 3 parts of aglomatolite were dispersed in 30.6 parts of water. The pH of this clay slurry was adjusted to 10 by adding 20% by weight of sodium hydroxide.

To this slurry, 0.1 parts of sodium hexametaphosphate and 0.2 parts of the sodium salt of a naphthalene sulfonic acid-form-aldehyde condensate (degree of polymerization — 5, molar ration 1:1) were added. Then 5 parts of a 10% aqueous solution of gelatin having a gelatin strength of 56 g and an isoelectric point of 7.7 were added thereto with stirring. After slowly adding a solution of 0.7 parts of zinc chloride in 10 parts of water while stirring, a solution containing 2.5 parts of 3,5-di-tert-butylsalicylic acid and 0.4 parts of sodium hydroxide was slowly added thereto. Then 5 parts of Dow latex 636 (trade name: styrene-butadiene latex produced by Dow Chemical Co.) were added to produce a coating solution.

This coating solution was applied in an amount of 3 g/m² (dry basis) to a sheet of paper having a weight of 50 g/m² and dried to produce a coated paper.

This coated paper was treated using a super calender to produce a sheet having a smoothness of 125 seconds (measured using a Beck smoothness tester).

Method of Examination

Pressure Resistance: Developer Sheet A was used.

After putting the capsule sheet on the developer sheet so as to face the surface of the capsules to the surface of the developer and pressing for 30 seconds using a pressure of 40 kg/cm², the color density on the surface of the developer sheet was measured using a reflection type spectrophotometer (wave length of measurement: $605\mu$).

Friction Resistance: Developer Sheet A was used.

After putting the capsule sheet on the developer sheet so as to face the surface of the capsules to the surface of the developer and moving the capsule paper by revolving the capsule paper under pressure (pressure: 20 g/cm², rate of revolution: 30 r.p.m., line speed 1 m/min), the color density of the mark developed on the clay paper was measured using the spectrophotometer described above.

Moisture Resistance: Developer Sheet A was used.

The capsule sheet was put on the developer sheet so as to face the surface of capsules to the surface of the developer sheet and pressed using a pressure of 200 g/cm². After leaving them in an atmosphere of RH 100% at 50° C, the color density of stains on the developer sheet was measured using the spectrophotometer described above.

Permeability of Capsule film:

1. The Developer Sheet B was put on the capsule sheet in the presence of water so as to face the surface of capsules to the developer sheet and dried at room temperature. Then the developed color density on the capsule sheet was measured using the spectrophotometer described above.

2. The Developer Sheet A was put on the capsule sheet in the presence of water so as to face the surface of capsules to the developer sheet and dried at room temperature. Then the developed density on the capsule sheet was measured using the spectrophotometer described above.

3. A developer slurry A was applied to the surface of the capsule sheet. After drying, the fog density was measured using the spectrophotometer described above.

Light Stability:

1. Coloring after Exposure:
After exposing the surface of the capsule sheet to sunlight, the color density of the sheet was measured using the spectrophotometer described above.
2. Activity of Color Former:
After exposing the surface of the capsule sheet to sunlight, the sheet was put so as to face to Developer Sheet A. Then, 600 kg/cm² of pressure was applied thereto to rupture the capsules, by which the content thereof transferred to the surface of the developer sheet. Then, the color density of the developed image was measured using the spectrophotometer described above.

The larger the density of the developed image is, the less the activity of the color former in the capsules decreases.

EXAMPLE 2

6 Parts of acid treated gelatin (from cattle hide) having an isoelectric point of 9.2 were dissolved in 25 parts of water at 40° C. 45 Parts of a color former oil having the following composition were added to this solution by pouring continuously. The mixture was agitated to produce an o/w emulsion containing emulsified drops having a drop size of 10 to 12µ.

| Composition of the Color Former Oil: | |
| --- | --- |
| Crystal Violet Lactone | 0.25 parts |
| 3-Methyl-2,2'-spiro-bi-(benzo(f) chromene) | 0.5 parts |
| 7-N,N-Diethylamino-3-(N,N-diethylamino)-fluoran | 7.5 parts |
| Rhodamine B-(p-nitroanilino)-lactam | 0.5 parts |
| 7-Diethylamino-2,3-dimethylfluoran | 2.5 parts |
| Benzoyl Leuco Methylene Blue | 2.0 parts |
| Monoisopropylbiphenyl | 70 parts |
| Crocin | 16 parts |

Then the emulsion was dispersed in 150 parts of warm water at 40° C with stirring. The encapsulation step described in the following was carred out with effective agitation. To this dispersion, 35 parts of a 10% solution of gum arabic and 10 parts of a 5% aqueous solution of the sodium salt of a styrene-maleic anhydride copolymer (Scripset 500 ... trade name: produced by the Monsanto Chemical Co.) were added. Then 10 wt% of citric acid was added dropwise thereto to adjust the pH to 4.50.

Then the mixture was cooled externally to accelerate the formation of the capsule films and the gelling thereof. After cooling to 8° C, 0.5 parts of 40% glyoxal and 0.5 parts of 37% formaldehyde were added thereto. After mixing for 2 minutes, 1 part of a 20 wt% aqueous solution of polyacrylic acid, 6 parts of a 20 wt% aqueous solution of a condensate of sodium methylnaphthalene sulfonate and formaldehyde (degree of polymerization 5; molar ratio — 1:1) and 12 parts of a 10 wt% aqueous solution of carboxymethyl starch (degree of etherification: 0.5) were added as a mixture.

Further, 20 parts of a 20 wt% aqueous dispersion of the compound of Synthesis 2 were added dropwise. After the addition, a 30% aqueous solution of potassium hydroxide was added thereto to adjust the pH to 9.5.

The temperature of the solution was elevated to 40° C by heating externally. This temperature was kept for 30 minutes to produce color former containing capsules.

The resulting capsules were useful for producing a pressure sensitive paper. For example, 10 parts of a 20 wt% aqueous solution of acetyl starch (degree of acetylization — 0.4), 1 part of a wheat starch powder having an average particle size of 18µ and 4 parts of Avicel (commercial name: microcrystalline cellulose, produced by the Asahi Chemical Industry Co.) were added to 100 parts of the produced capsule slurry, and the resulting mixture was applied to a paper having a weight of 50 g/m² so as to be 5.5 g/m² (dry basis) and dried.

This coating paper yielded a black color image with Developer Sheet A. Further, the above described additives were added in the same amounts as those described above to capsules produced without using the compound of Synthesis 2, and the resulted mixture was applied to paper a weight of 50 g/m² so as to be 5.5 g/m² (dry basis) and dried to produce a coating paper (Comparison — 2).

The properties of both papers are shown in Table 2. It can be seen from the results contained in this table that capsules having improved strength, decreased permeability of capsule films and improved resistance are produced according to the method of this invention.

Table 2

| Properties of Capsule Films | Example 2 D | Comparison 2 D |
| --- | --- | --- |
| Strength of Capsule Film | | |
| Pressure Resistance | 0.10 | 0.14 |
| Friction Resistance | 0.07 | 0.10 |
| Moisture Resistance | 0.27 | 0.38 |
| Permeability of Capsule Film | | |
| 2 | 0.08 | 0.25 |
| 3 | 0.08 | 0.26 |

EXAMPLE 3

To 30 parts of the diphenylmethane oil

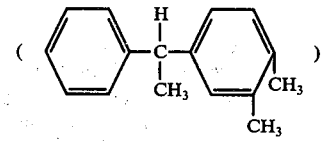

in which 2.5% (by weight) of Crystal Violet Lactone, 2.0% (by weight) OF Benzoyl Leuco Methylene Blue and 0.5% (by weight) of Rhodamin B-anilinolactam were dissolved as the color former for a pressure-sensitive recording paper, 6 parts of Colonate HL (commercial name: hexamethylene diisocyanatetrimethylolpropane addition product having residual isocyanate groups, molar ration — 1:3 produced by Nippon Polyurethane Industry Co.), 2 parts of Actokol 51–530 (commercial name; polyoxypropylene polyol, produced by Takeda Chemical Co.) and 0.05 parts of dibutyl tin laurate were added and dissolved therein. The resulting oily solution was added to 50 parts of an aqueous solution containing 2 parts of carboxymethyl cellulose (approximate molecular weight — 300; degree of etherification — 0.75) and 2 parts of polyvinyl alcohol (saponification degree: 87%, average degree of polymerization: about 500) at 20° C with stirring.

To this mixture, a solution of 1 part of 3,9-bis-(3'-aminopropyl)-2,4,8,10-tetraoxaspiro(5,5)undecane, 5 parts of the compound of Synthesis 3 and 10 parts of water was added. Further, 2 parts of a 20 wt% NaOH solution were added thereto. During the above described treatment, the temperature of the system was kept less than 20° C. Furthermore, 2 parts of 37% formaldehyde were added thereto. In order to accelerate the reaction, the temperature of the system was increased to 70° C. This temperature was kept for 30 minutes to produce color former containing capsules having a firm capsule film.

On the other hand, the capsules which were prepared without adding 3,9-bis-(3'-aminopropyl)-2,4,8,10-tetraoxaspiro-(5,5)undecane, the compound of Synthesis 5 and formaldehyde in this example were used for the purposes of comparison (Comparison 3). The results of the comparative examinations are shown in Table 3.

To each capsule solution prepared in the above described manner, 6 parts of wheat starch having a particle size of 15μ and 40 parts of a 10 wt% solution of oxidized starch were added. The mixtures were applied to a paper having a weight of 50 g/m² so as to be 5.0 g/m² (dry basis) and dried.

Table 3

| Properties of Capsule Films | Example 3 D | Comparison 3 D |
|---|---|---|
| Strength of Capsule Film | | |
| Pressure Resistance | 0.08 | 0.15 |
| Friction Resistance | 0.06 | 0.14 |
| Moisture Resistance | 0.10 | 0.25 |
| Permeability of Capsule Film | | |
| 1 | 0.14 | 0.36 |
| 2 | 0.06 | 0.15 |
| 3 | 0.05 | 0.18 |
| Heat Resistance of Capsule Film | 100% | 85% |

Heat Resistance Test for the Capsule Film

The thermal strength of the capsule coated paper was calculated using the following equation.

$$D_1/D_2 \times 100 = \text{Heat resistance}$$

wherein $D_1$ is the color density of the developed developer sheet which results on heating the capsule coated paper at 90° C for 10 hours, facing the surface of the capsule coating paper to the surface of the developer sheet and applying a pressure of 600 kg/cm² rupture the capsules. $D_2$ is the color density of the developed developer sheet which results on facing the surface of the unheated capsule coated paper to the surface of the developer sheet and applying a pressure of 600 kg/cm² rupture the capsules.

EXAMPLE 4

A color former oil was produced by mixing the following materials.

| | |
|---|---|
| Santotherm 66 (hydrogenated terphenyl, produced by Mitsubishi-Monsanto Co.) | 30 parts |
| Crystal Violet Lactone | 0.5 parts |
| 3-Methyl-2,2'-spirobi-(benzo(f) chromene) | 0.5 parts |
| Benzoyl Leuco Methylene Blue | 0.5 parts |
| Kerosine | 5 parts |

5 Parts of polymethyl methacrylate and 1 part of Colonate L (commercial name; tolulenediisocyanate-trimethylolpropane addition product, produced by Nippon Polyurethane Industry Co.) were dissolved in 15 parts of methylene chloride. To this solution, the above described color former oil was added. (the temperature was kept to 16°–18° C.) (hereinafter designated (W — oil)).

The (W — oil) was emulsified in an aqueous solution of 4 parts of gum arabic, 2 parts of polyvinyl alcohol (PVA-210 above described) and 30 parts of water using a homogenizer having a high shearing force to produce an o/w emulsion having an average dropsize of 15μ. The temperature during emulsification was kept at 18°–20° C. The emulsion was then added in 100 parts of water.

To the resulted solution, 3 parts of the compound of Synthesis 4 and 25 parts of a 10% aqueous solution of dialdehyde starch were added, and further 5 parts of a 20% aqueous solution of hexamethylenediamine was added thereto.

The temperature of the solution was increased to 70° C by heating externally with stirring. This temperature was kept for 1 hour to conclude the encapsulation.

The resulting capsules had a heat resistance of 95% and good strength. They were useful for producing a pressure-sensitive copying paper.

EXAMPLE 5

25 Parts of dibutylmaleate were emulsified in an aqueous solution of 5 parts of polyvinylalcohol (average degree of polymerization: about 1000, saponification degree: 97%), 5 parts of the sodium salt of carboxymethyl cellulose (as described in Example 3) and 45 parts of water to produce and o/w emulsion having an average dropsize of 15 to 20μ.

The above resulting emulsion was added to 100 parts of water at 30° C. 20 parts of 35 wt% zirconium ammonium carbonate and 5 parts of 50 wt% urea were then added thereto with stirring. The temperature was increased to 50° C. The mixture was kept at this temperature for 1 hour, and then it was cooled to 25° C. Then 3 parts of the compound of Synthesis 4, 5 parts of a 50 wt% aqueous solution of tetraethylenepentamine, 1 part of adipic acid and 2 parts of a 37 wt% aqueous solution of formaldehyde were added thereto. The temperature was increased again to 65° C. The mixture was kept at this temperature for 1 hour to conclude the encapsulation.

The resulting capsules were spray dried to produce a dibutylmaleate containing capsule powder.

EXAMPLE 6

A perfume oil was prepared from 10 parts of orange perfume and 15 parts of trioctyltrimellitate.

This perfume oil was emulsified in an aqueous solution of 2 parts of the sodium salt of carboxymethyl cellulose (as described in Example 3), 3 parts of gum arabic and 30 parts of water to produce an o/w emulsion having an average drop size of 20 to 30μ. 100 Parts of water at 20° C were added with stirring. Then 20 parts of U-Ramin P-1800 (trade name; a cation type modified urea resin, produced by Mitsui Toatsu Chemicals Inc.), 2 parts of the compound of Synthesis 6, 10 parts of a 10 wt% guanidine sulfate and 2 parts of 37 wt% formaldehyde were added thereto.

Further, 20 wt% potassium hydroxide was added dropwise thereto to adjust the pH to 11.

The temperature was gradually increased to 60° C by heating externally while stirring slowly. The mixture was kept at this temperature for 24 hours.

To the resulting orange perfume capsule solution, 30 parts of a 20 wt% aqueous solution of polyvinyl alcohol (saponification degree: 87%, average degree of polymerization: about 1000) and 7 parts of corn starch were added to make a perfume ink. A paper support was printed with this ink using silk screen process. When the printed parts were rubbed with a finger, they gave out an intense orange scent.

Furthermore, when the capsules were broken by pressing the printed surface after the printed paper support was hung on a wall for a week, they gave out an orange scent. Thus, it can be seen that the capsules produced by the method of the present invention have an excellent perfume preservability.

EXAMPLE 7

7.5 Parts of Epikote 834 (trade name; an epoxy resin, produced by Shell Chemical Co.) were dissolved in 20 parts of toluene. An aqueous solution of 1 part of polyvinyl alcohol (average degree of polymerization: 1000; saponification degree: 87%), 3 parts of carboxymethyl cellulose approximate molecular weight: 300; degree of etherification: 075 and 25 parts of water was emulsified in the above toluene solution to produce an o/w emulsion having an average drop size of 10 to 15μ. To this emulsion, 50 parts of water at 20° C were added and then 2 parts of diethylaminopropylamine, 2 parts of the compound of Synthesis 7 and 1 part of 37 wt% formaldehyde were added thereto. To the mixture, 10 wt% sodium hydroxide was added to adjust the pH to 10.0. The temperature of the solution was increased to 60° C. The mixture was kept at this temperature for 24 hours while stirring.

As the result of carrying out the heat resistance test at 50° C for 24 hours, toluene did not decrease in the resulting toluene containing capsules.

EXAMPLE 8

6 Parts of acid treated gelatin (from whale) having an isoelectric point of 8.8, 4 parts of gum arabic and 0.5 parts of carboxymethyl starch (degree of etherification: 0.4, raw material: potato starch) were dissolved in 30 parts of water at 40° C. A liquid crystal composition consisting of 3 parts of methoxybenzylidene-p-n-butylaniline, 5 parts of cholesteryl chloride, 30 parts of cholesteryl nonylate and 4 parts of cholesteryl cinnamate was emulsified in the above solution to produce an o/w emulsion having an average drop size of 6 to 25μ. To the resulting emulsion, 175 parts of water at 35° C were added, and then 1 part of a phenol resin (a resorcinol modified phenol-formaldehyde resin, resin content: 60%) was added thereto. Further, a 10 wt% aqueous solution of adipic acid was added dropwise thereto to adjust the pH to 4.45. It was cooled to 8° C externally to accelerate the deposition of the colloid and the gelling thereof with the stirring being continued.

15 Parts of a 10 wt% solution of the sodium salt of carboxymethyl cellulose (degree of etherification: 0.78) were added thereto. After 1 part of 25 wt% glyoxal and 0.5 parts of 37 wt% formaldehyde were added, the pH of the mixture was adjusted to 10.0 by adding 10 wt% sodium hydroxide.

To the mixture, 3 parts of a 50 wt% aqueous dispersion of the compound of Synthesis 2 were added. The temperature of the mixture was increased to 40° C to produce a liquid crystal containing compound.

To this liquid, 4 parts of corn starch (average particle size: 15 to 20μ), 4 parts of wheat starch (average particle size: 25 to 35μ) and 10 parts of a SBR latex (styrene-butadiene rubber) were added.

A biaxial stretched polystyrene film support was treated using corona discharging to give a contact angle of about 60° C. Then the above described capsule solution was applied thereto and dried.

While the invention has been described in detail and with reference to specific embodiments thereof, it will be apparent to one skilled in the art that various changes and modifications can be made therein without departing from the spirit and scope thereof.

What is claimed is:

1. In a method of forming microcapsules having low porosity microcapsule films using a complex coacervation process which comprises the following steps of: (1) emulsifying a water-immiscible oil as a core material to be encapsulated in an aqueous solution of at least one hydrophilic colloid inonizable in water (the first sol), and admixing an aqueous solution of a hydrophilic colloid (the second sol) having an electric charge opposite to that of the first sol, the time of admixing the second sol being freely varied, or emulsifying a water-immiscible oil in an aqueous solution of hydrophilic colloids which are ionizable in water and at least one of which is positively charged; (2) either adding water thereto or adjusting the pH thereof to cause coacervation, thus obtaining coacervates wherein a complex colloid is adhered to the individual oil droplets; (3) cooling the coacervates to cause gelation thereof; (4) and adjusting the pH to the alkaline side in the presence of a hardening agent, or adding a hardening agent after adjusting the pH to the alkaline side, the improvement which comprises chemically or ionically binding a water soluble or water dispersible heterocyclic amine, said heterocyclic amine being a symmetrical or asymmetrical spiroacetal diamine represented by the following formula

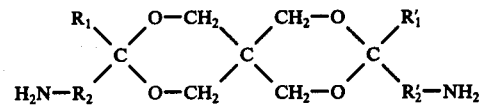

wherein $R_1$ and $R_1'$ each represent a hydrogen atom or a lower alkyl group and $R_2$ and $R_2'$ each represents a linear or a branched chain alkylene group having 1 to 7 carbon atoms or a derivative thereof selected from the group consisting of a condensation product of said heterocyclic amine with a compound containing at least one oxirane group, an addition product produced by reacting said heterocyclic amine with acrylonitrile, a reaction product produced by reacting said heterocyclic amine with urea, thiourea or guanidine and a reaction product produced by reacting said heterocyclic amine with an alkylene oxide, to the microcapsule film forming material by adding said amine during said complex coacervation process, or depositing said heterocyclic amine alone or a water insoluble material formed by reaction with said amine onto the microcapsule films after formation of said films, said heterocyclic amine being used in an amount of from 1/1000 to 1/2 by weight based on the weight of said core material.

2. The method of claim 1, wherein said heterocyclic amine is used in an amount of from 1/100 to 1/5 by weight based on the weight of said core material.

3. The method of claim 1, wherein said heterocyclic amine is selected from the group consisting of 3,9-bis- (2'-aminomethyl)-2,4,8,10-tetraoxaspiro-(5,5)-undecane, 3,9-bis-(2'-aminoethyl)-2,4,8,10-tetraoxaspiro-(5,5)-undecane; 3,9-diethyl-3,9-bis-(2'-aminoethyl)-2,4,8,10-tetraoxaspiro(5,5)-undecane; 3,9-bis-(3'-aminopropyl)-2,4,48,10-tetraoxaspiro-(5,5)-undecane; 3,9-bis-(2'-aminopropyl)-2,4,8,10-tetraoxaspiro-(5,5)-undecane; 3,9-bis-(4'-aminobutyl)-2,4,8,10-tetraoxaspiro-(5,5)-undecane; 3,9-bis-(5'-aminopentyl)-2,4,8,10-tetraoxaspiro-(5,5)-undecane; 3,9-bis-(1',1'-dimethyl-4'-aminobutyl)-2,4,8,10-tetraoxaspiro-(5,5)-undecane; 3,9-bis-(5'-aminopentyl)-2,4,8,10-tetraoxaspiro-(5,5)-undecane; 3,9-bis-(6'-aminohexyl)-2,4,8,10-tetraoxaspiro-(5,5)-undecane and 3,9-(7'-aminoheptyl)-2,4,8,10-tetraoxaspiro-(5,5)-undecane.

4. The method of claim 3, wherein said heterocyclic amine is used in an amount of from 1/100 to 1/5 by weight based on the weight of said core material.

5. The method of claim 1, wherein said compound having an oxirane group is an alkyl glycidyl ether, a condensate of epichlorohydrin and bisphenol, a phenol epoxide comprising the reaction product of epichlorohydrin with a phenol resin precondensate, a polyglycol oxide comprising the reaction product of a polyglycol with epichlorohydrin, a glycidyl ester, an alkylene oxide, epoxy polybutadiene, an epoxidized vegetable oil or an epoxy glyceride.

6. The method of claim 1, wherein said heterocyclic amine is used alone or used together with at least one water soluble compound which forms a water insoluble material upon reaction with said heterocyclic amine, said water soluble compound being selected from the group consisting of aldehydes and epoxy compounds.

7. The method of claim 6, wherein said compound is added in an amount of about 1/100 to about 10 times by weight to the weight of said heterocyclic amine used.

8. The method of claim 6, wherein said compound is added in an amount of about 1/10 to about 2 times by weight to the weight of said heterocyclic amine.

9. The method of claim 1, wherein a water-soluble or water-dispersable amine having at least one amino group other than said heterocyclic amine is used together with said heterocyclic amine in an amount below about 70% by weight of said heterocyclic amine.

10. The method of claim 9, wherein said water-soluble or water-dispersable amine is selected from the group consisting of octylamine, nonyl amine, dodecyl amine, stearyl amine, ethylene diamine, trimethylene diamine, 1,7-diaminoheptane, 1,9-diaminononane,1,10-diaminodecane, N,N'-diaminopropyl piperazine, diethylene triamine, triethylene tetramine, tetraethylene pentamine, m-hexamethylene triamine, tris-(N-aminopropyl)isocyanurate, guanidine and trimethylolmelamine.

11. The method of claim 10, wherein said water-soluble or water-dispersable amine is used in an amount below about 50% by weight of said heterocyclic amine.

12. The method of claim 6, wherein said aldehyde is selected from the group consisting of acetaldehyde, formaldehyde, glyoxal, methylglyoxal, glutaraldehyde, acrolein, 2-hydroxyadipaldehyde and dialdehydostarch.

13. The method claim 1, wherein said heterocyclic amine is added during or after the cooling step at a temperature below the gelling point of an ionizable hydrophilic colloid.

14. The method of claim 13, wherein said heterocyclic amine is used in an amount of from 1/100 to 1/5 by weighr based on the weight of said core material.

15. The process of claim 1, wherein after said step (4) of said complex coacervation process, the temperature of the system is elevated to more effectively harden the gelled coacervate after adding both a hardening agent and an alkali.

16. The process of claim 1, wherein said amine is added during or after said cooling step (3.)

17. The process of claim 1, wherein said amine is added during a pre-hardening treatment step.

* * * * *